United States Patent [19]

Fujita et al.

[11] Patent Number: 4,579,271

[45] Date of Patent: Apr. 1, 1986

[54] ADJUSTABLE JIG WITH CURVED SURFACES

[75] Inventors: Yoshitada Fujita, Kobe; Sadashi Hanada, Miki, both of Japan

[73] Assignee: Kawasaki Jukogyo Kabushiki Kaisha, Kobe, Japan

[21] Appl. No.: 731,935

[22] Filed: May 7, 1985

[30] Foreign Application Priority Data

Jul. 9, 1984 [JP] Japan ................................ 59-142589

[51] Int. Cl.⁴ ............................................. B23K 37/04
[52] U.S. Cl. ..................................... 228/46; 228/49.1; 269/296; 269/266
[58] Field of Search ................. 228/50, 222, 46, 49.1, 228/49.3, 49.4; 269/296, 910, 266

[56] References Cited

U.S. PATENT DOCUMENTS 3,333,296  8/1967  Ednall ................................ 269/296
4,527,783  7/1985  Collora et al. ..................... 269/266

Primary Examiner—Nicholas P. Godici
Assistant Examiner—Karen Skillman
Attorney, Agent, or Firm—Leydig, Voit & Mayer, Ltd.

[57] ABSTRACT

An adjustable jig with curved surfaces comprising a plurality of rails arranged parallel to constitute a curved surface. The surface plate comprises a pedestal on which each of the rails rests. The height of the pedestal can be varied so as to modify a curvature of the curved surface. For this purpose, the jig comprises a device for lifting the rails and a device for shifting the pedestal.

4 Claims, 11 Drawing Figures

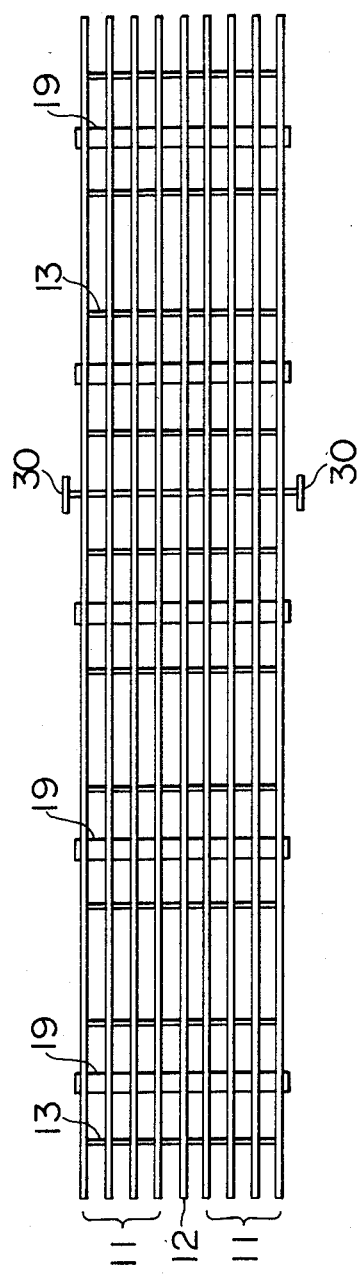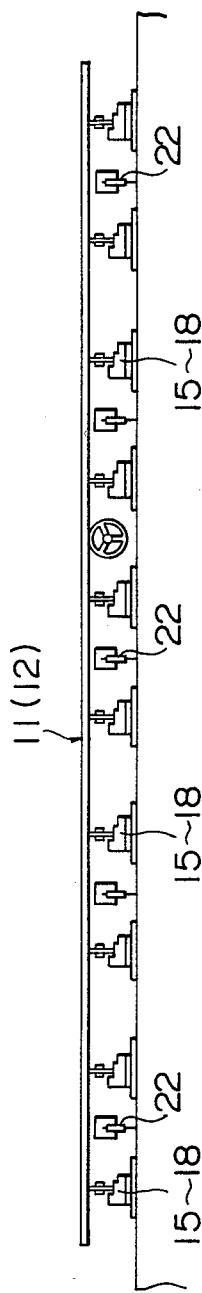

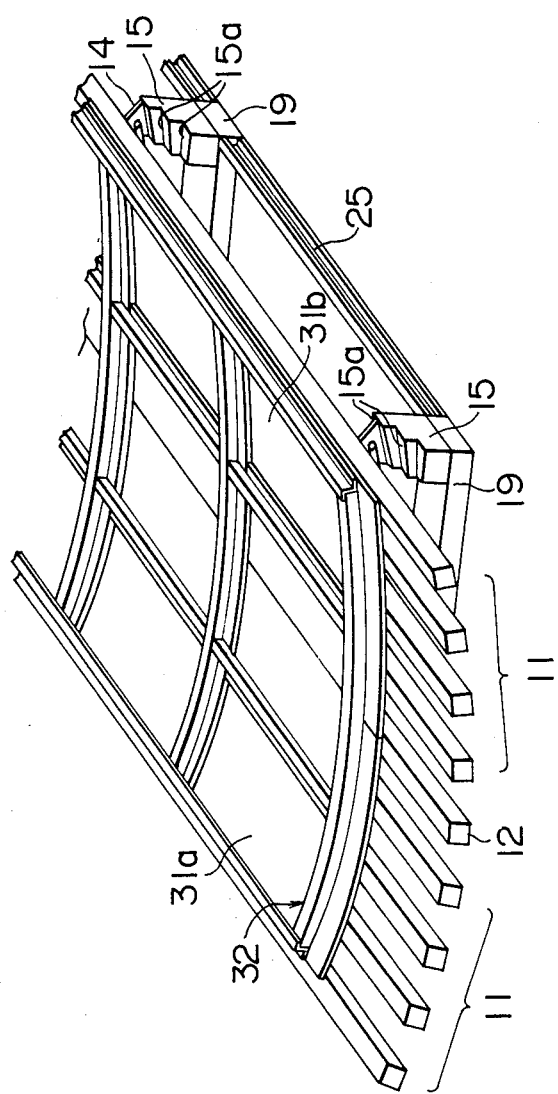

ADJUSTABLE JIG WITH CURVED SURFACES

BACKGROUND OF THE INVENTION

1. Field of the Invention

This invention relates to an assembly jig for manufacturing a long structure with an arcuate cross section such as a roof construction of railway carriages etc., and more specifically to an adjustable jig with curved surfaces.

2. Description of the Related Art

A long structure like a roof construction of a railway carriage is generally constructed from a roof board, cross members, and longitudinal members, and has generally an arcuate cross section. The conventional methods for manufacturing such a construction require therefore the use of an assembly jig comprising a curved jig with an arcuate cross section. For example, the roof construction of the railway carriage is made by the steps of placing, on the concave surface of the jig, thin steel sheets in parallel side by side, welding them to each other, laying down a roof framing of the steel sheets, and welding or tack welding the roof framing to the steel sheets.

The manufacture of various roof constructions with arcuate cross sections of various radii of curvature requires various special assembly jigs for different roof constructions. Therefore, the assembly jigs have to be replaced for different one before conducting another assembling of different roof constructions.

The conventional curved jigs thus suffer from the following disadvantages:

(a) The curved jigs have to be replaced for another one for a different roof construction with a different cross section.
(b) Since the curved jigs used in this kind of work are very heavy, an overhead travelling crane or a fork-lift truck has to be used to move them in the replacement operation.
(c) Since the curved jigs are made of thick steel plates, it is difficult and time-consuming to shape the thick steel plates to the curvature required.
(d) During welding of steel sheets on the curved jig to form a roof board, the heat of the welding might cause distortion in the shape of the curved jigs, with a resultant loss of precision of the curved jig.
(e) Where various curved jigs with different curvatures are prepared in advance, they require a wide storage space. On the other hand, where the curved jig is made up specially at each time, it takes up a great deal of time.
(f) Since the curved jigs are made up from a plurality of steel plates welded to each other end to end, the longitudinal alignment is poor, which in turn means the overall shape of the finished roof construction is not good.
(g) An exchange of the curved jigs requires much time and hard labor.

SUMMARY OF THE INVENTION

In the light of this situation, this invention is intended to overcome the problems of the conventional art by providing a simple yet rational means for eliminating the need for replacing the curved jig for another one, such means offering a crane-less, economical, quick change-over and safe operation and a product of high quality.

In order to overcome the problems inherent in the conventional art, this invention proposes an adjustable jig with curved surfaces which comprises a plurality of rails arranged parallel to constitute a curved surface, a device for linking the rails, a device for lifting the rails, at least one foot attached to each of the rails, at least one pedestal prepared for each of the rails and supporting the foot of each of the rails, and a device for shifting the pedestals.

The invention offers the following advantages:

(a) Work required to alter the curvature of the adjustable curved jig to fit new specifications can easily be done by a single operator in the minimum time.
(b) The invention completely eliminates the need for the preparatory work which, in the conventional art, is required in replacing the assembly jig for another one.
(c) The adjustable jig can be adjusted to the desired curvature simply by selecting the appropriate step of the pedestal, or by replacing the pedestal for another one.
(d) There is no need to use a crane or a fork-lift truck in changing the curvature of the curved jigs.
(e) Complete safety is assured in changing the curvature of the curved jig, since no heavy objects have to be moved.
(f) Unbroken rails are used for defining the long jigs, as distinct from the joined sheets in the conventional art, resulting in greater precision of the longitudinal alignment and in improved quality of the finished products.
(g) The heat of the welding less affects the curved jig, since the separate rails are used as distinct from the conventional art using an integral welded surface plate. Thus, the precision of the curved jig is maintained and the quality of the product is improved.

BRIEF DESCRIPTION OF THE DRAWINGS

FIG. 3 is a plan view of an adjustable jig with curved surfaces of the invention;

FIG. 4 is a front elevational view of the adjustable jig shown in FIG. 3;

FIG. 8 is an enlarged perspective view of part of a roof construction during assembling operation using the adjustable jig shown in FIG. 3;

DESCRIPTION OF THE PREFERRED EMBODIMENTS

Before going on to describe embodiments of the invention, the conventional jig for curved surfaces will be explained with specific reference to FIGS. 1 and 2.

Figure 1:
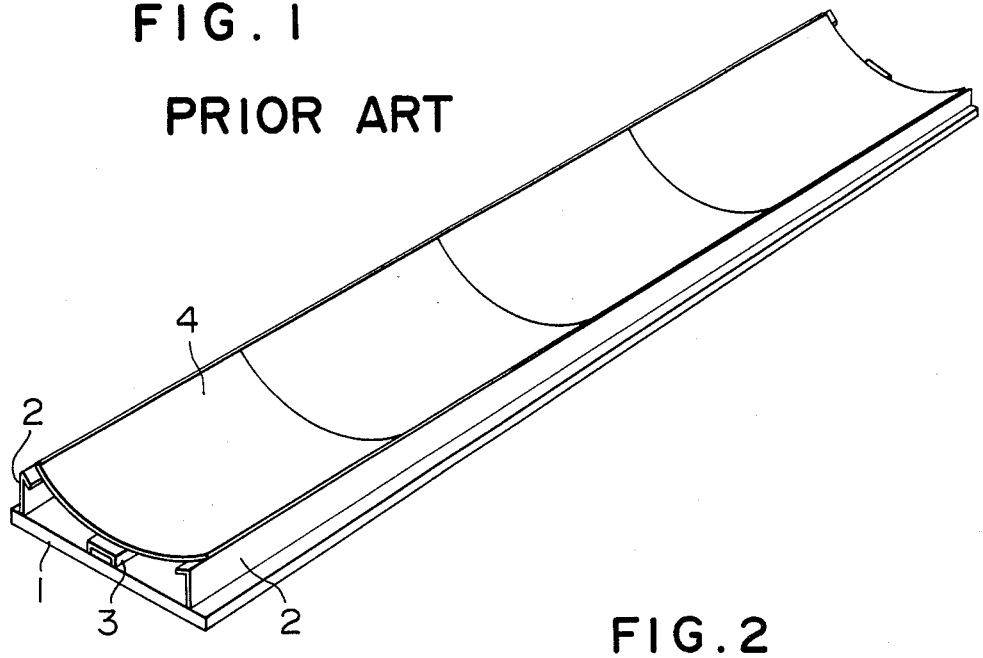
FIG. 1 is a perspective view showing the conventional jig with curved surfaces.

FIG. 1 shows a base 1 supporting the whole structure. On the base 1 are placed supports 2, 3 lengthwise along the left and right sides and the center. On the supports 2, 3 is supported a curved surface plate 4. This curved surface plate 4 consists of a plurality of steel plates joined together end to end and shaped to the appropriate curvature for the roof construction to be made.

Figure 2:
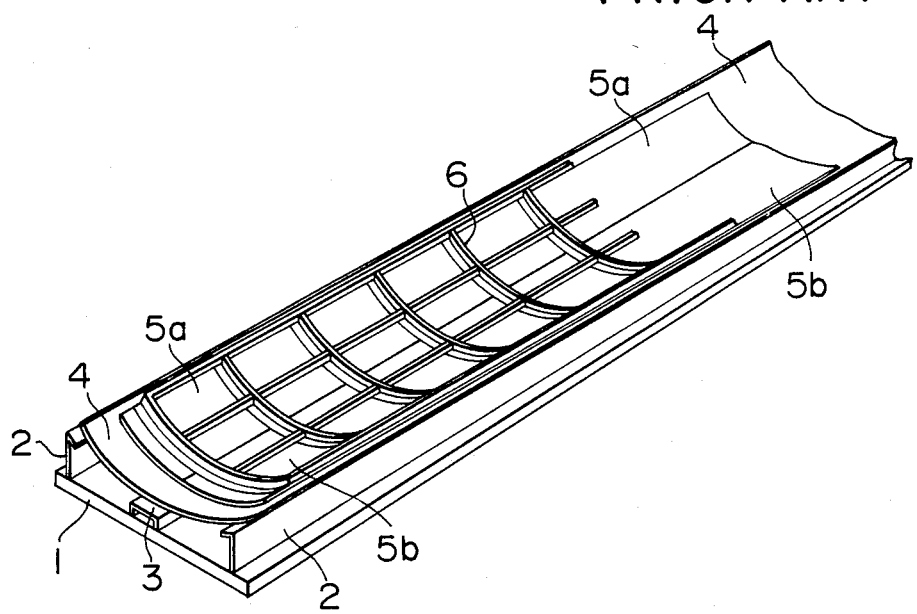
FIG. 2 is a perspective view showing a part of the same jig shown in FIG. 1 as used in the assembling of a long structure with an arcuate section.

FIG. 2 shows the curved jig in use. Roof boards 5a, 5b are lined up lengthwise side by side along the curved surface plate 4 and are welded together. A roof framing 6 is placed on the roof boards 5a, 5b and welded to them.

The conventional curved jig shown in FIGS. 1 and 2 has the several disadvantages, as already mentioned in the Description of the Related Art.

The invention will now be described in detail with reference to FIGS. 3 to 10.

This new curved jig comprises a plurality of rails 11 including a central rail 12 which constitutes the central part of the jig. The rails 11, 12 are disposed in parallel lengthwise as shown in FIG. 3.

Figure 5:
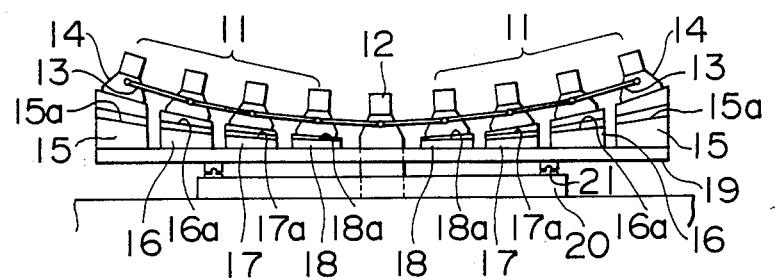
FIG. 5 is an enlarged side elevational view of the adjustable jig shown in FIG. 3.

The rails 11 are designed to be movable so that the curved jig can be adjusted to the desired curvature, with the central rail 12 being stationary to form a stationary central part of the jig. The curved surface plate comprises links 13 to hold the rails 11, 12 together to prevent separation of the rails. The links 13 are connected to feet 14 of the rails 11 through pins to allow free movement of the rails to any desired curvatures. Pedestals 15, 16, 17, 18 are provided to support the feet 14 of the rails 11. Each of the pedestals comprises a plurality of steps 15a, 16a, 17a, 18a to permit the upper surface of the rails 11 to be adjusted to the required curvature. By placing the feet 14 on the appropriate steps 15a–18a of the pedestals 15–18, the upper surfaces of the rails 11, 12 can be adjusted to form a curved surface with a good precision as shown in FIG. 5. Although the pedestals 15–18 may be integrally made to form a single body, it is better from the point of view of their manufacture and replacement that they are made separate as best shown in FIG. 5. The steps 15a–18a of the pedestals 15–18 comprise inclined upper surfaces sloping downward toward the central rail 12 so as to form a concave curved surface as a whole with a good precision. The steps 15a–18a, however, may comprise inclined upper surfaces sloping upward toward the central rail 12 so as to form a convex curved surface as a whole. It is to be noted also that, instead of having a number of steps, the pedestals may have continuous inclined surface 15a', see FIG. 7b, so that the curvature of the rails can be adjusted continuously. However, with this modification a long time would be required to adjust the position of the pedestals. Therefore, in practice the embodiment shown in FIG. 5 is most preferable.

The pedestals 15–18 are mounted on a framework 19, which in turn rests on a base 20 through slide bearings 21 so that the pedestals can be shifted lengthwise along the jig, i.e. along the axes of the rails 11, 12.

Figure 6:
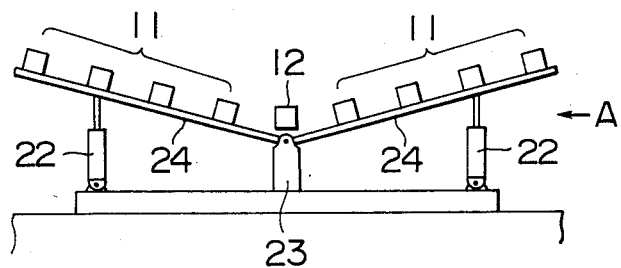
FIG. 6 is a side elevational view of a lifting device of the adjustable jig shown in FIG. 3.

FIG. 6 shows a lifting device A for lifting all the rails 11 together so that the pedestals 15–18 can then be moved freely along lengthwise of the curved surface plate in the curvature changing operation. The lifting device A is operated by hydraulic or pneumatic cylinders 22 which raise up two levers 24 hinged at a fixed center 23. The two levers 24 raise the rails 11 up all at a time to separate the feet 14 of the rails 21 from the pedestals 15–18. Next, the framework 19 on which the pedestals 15–18 are mounted are shifted lengthwise to a desired position. Finally, the cylinders 12 are contracted to have the feet 14 of the rails 11 rest on the desired steps 15a–18a of the pedestals 15–18, whereby the curved jig has the aimed curvature.

Figure 7A:
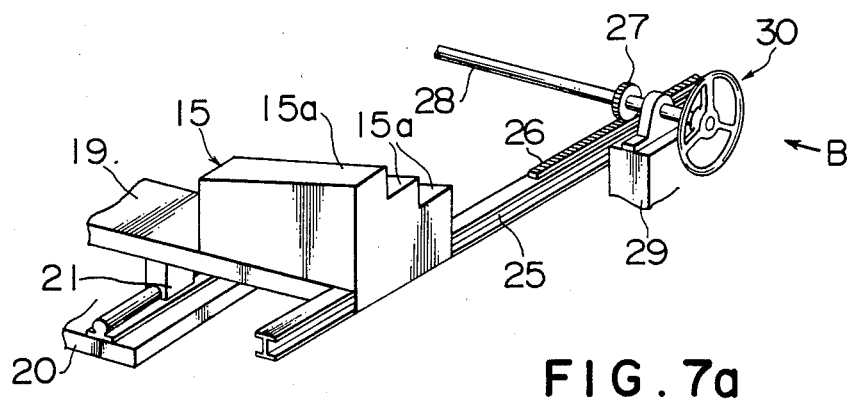
FIG. 7a is a perspective view of an essential portion of a shifting device for pedestals of the adjustable jig shown in FIG. 3.
Figure 7B:
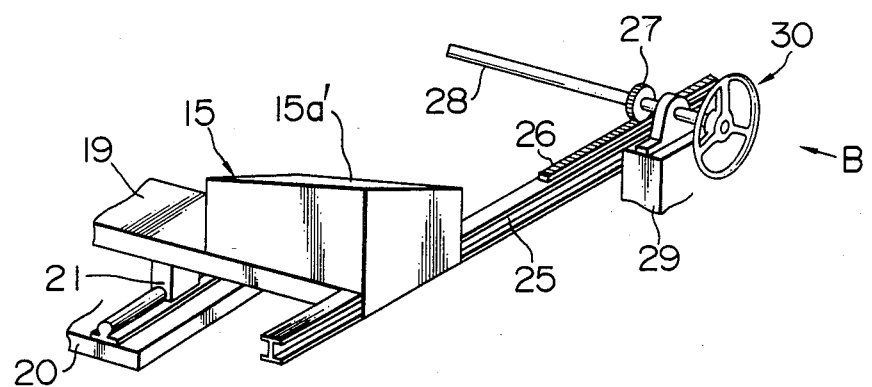
FIG. 7b is a view, similar to FIG. 7a, showing modified pedestals of the adjustable jig.

FIG. 7a and FIG. 7b show a shifting device B for shifting the pedestals 15–18 lengthwise of the curved jig. The shifting device B has a connecting bar 25 which interconnects the frameworks 19 holding the pedestals 15–18 in position. On part of the upper surface of the connecting bar 25 is secured a rack 26 which meshes with a pinion 27 whose shaft 28 is supported in a holder 29. The shifting device B is operated by rotating a wheel 30 attached to the end of the pinion shaft 28. All of the pedestals 15–18 are shifted by rotating the wheel 30 through the action of the pinion 27, rack 26 and connecting bar 25.

If required, the curved jig may be provided with separate shifting devices for respective rails 11 so as to use the different steps for different pedestals to form any desired shapes of the curved jig.

FIG. 8 shows the adjustable curved jig in use. Roof boards 31a, 31b are placed in parallel on the adjustable rails adjusted to have the desired curvature. The roof boards 31a, 31b are welded to each other, the welding portion being on the central rail 12. A roof framing 32 is placed on the roof boards. Finally, the roof framing 32 is welded to the roof boards to complete the roof construction. Further, the adjustable curved jig may be used for assembling the roof framing per se. That is, roof framing members are placed at desired positions on the adjustable rails and welded or fastened to each other to complete the roof framing 32.

Figure 9:
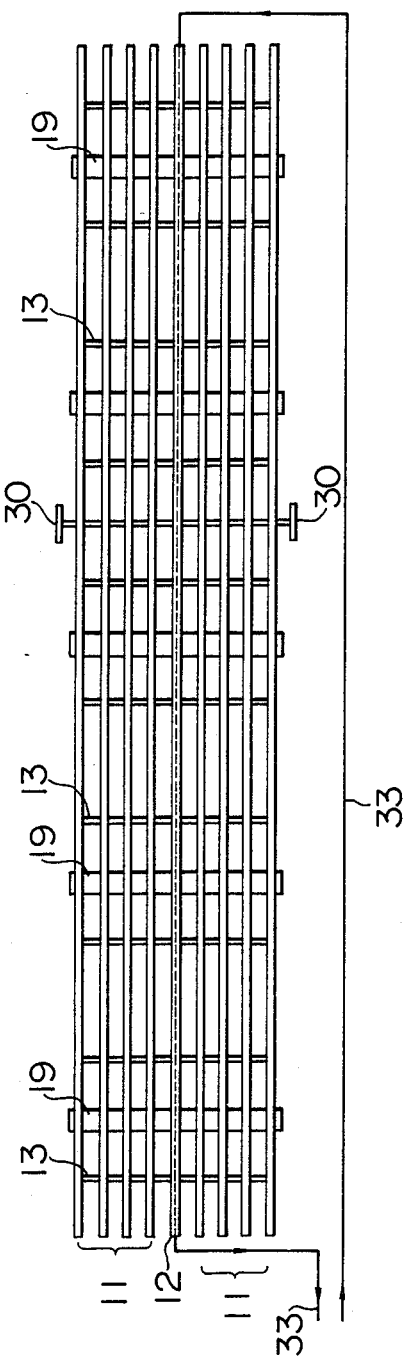
FIG. 9 is a plan view of the adjustable jig in which cooling water is supplied through the central rail.
Figure 10:
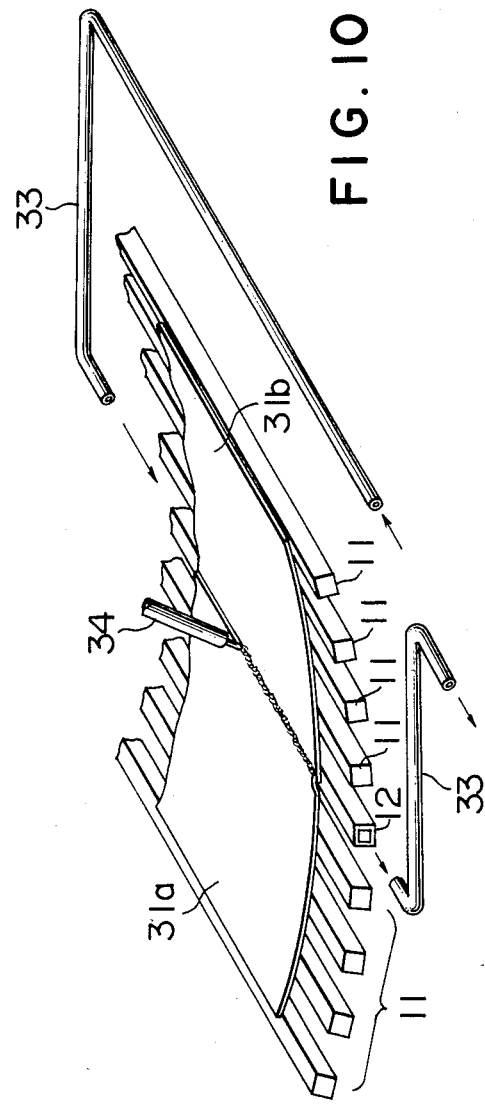
FIG. 10 is a perspective view of an essential portion of the adjustable jig shown in FIG. 9.

FIGS. 9 and 10 show a modification of the embodiment of the adjustable curved jig. The central rail 12, above which the two roof boards 31a, 31b are to be welded to each other, is formed of a hollow piece. Water pipes 33 are connected to the central rail 12 to supply cooling water to it, so that the heat generated by the welder 34 as the roof boards 31a, 31b are welded can be transmitted outside. Thus, less heat affects the central rails 12 and the roof boards 31a, 31b.

The embodiment of the invention has been explained for the roof structure of the railway carriages. The invention, however, is not exclusively for this purpose and the invention may be applied to the assembling of other structures having a partly arcuate cross section such as the side structure of railway carriages etc.

We claim:

1. An adjustable jig with curved surfaces comprising:
    a plurality of rails arranged parallel to constitute a curved surface;
    means for linking the rails to each other;
    means for lifting the rails together;
    at least one foot attached to each of the rails;
    pedestal means prepared for each of the rails and supporting the foot of each of the rails;
    means for shifting the pedestal means with respect to the rails.

2. An adjustable jig with curved surfaces as claimed in claim 1, in which each of said pedestal means has a plurality of steps.

3. An adjustable jig with curved surfaces as claimed in claim 1, in which each of said pedestal means has a continuous inclined surface.

4. An adjustable jig with curved surfaces as claimed in claim 1, in which at least one of said rails is made hollow, so that cooling water is supplied through the hollow rail to transmit heat of welding outside.

* * * * *